(12) United States Patent
Hibino et al.

(10) Patent No.: US 11,875,565 B2
(45) Date of Patent: Jan. 16, 2024

(54) METHOD OF SELECTING IMPORTANT DIGITAL IMAGES

(71) Applicant: Kodak Alaris Inc., Rochester, NY (US)

(72) Inventors: Stacie L. Hibino, Rochester, NY (US); Joseph A. Manico, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 17/888,306

(22) Filed: Aug. 15, 2022

(65) Prior Publication Data

US 2022/0392218 A1 Dec. 8, 2022

Related U.S. Application Data

(63) Continuation of application No. 16/786,610, filed on Feb. 10, 2020, now Pat. No. 11,417,094, which is a continuation of application No. 15/824,657, filed on Nov. 28, 2017, now Pat. No. 10,558,860, which is a continuation of application No. 14/285,163, filed on May 22, 2014, now Pat. No. 9,858,504, which is a continuation of application No. 12/889,557, filed on Sep. 24, 2010, now Pat. No. 8,774,528.

(51) Int. Cl.
| | |
|---|---|
| *G06K 9/00* | (2022.01) |
| *G06V 20/20* | (2022.01) |
| *G06F 16/54* | (2019.01) |
| *G06F 16/583* | (2019.01) |
| *G06V 20/30* | (2022.01) |

(52) U.S. Cl.
CPC .............. *G06V 20/20* (2022.01); *G06F 16/54* (2019.01); *G06F 16/5838* (2019.01); *G06F 16/5854* (2019.01); *G06V 20/30* (2022.01)

(58) Field of Classification Search
None
See application file for complete search history.

(56) References Cited

U.S. PATENT DOCUMENTS

| | | | |
|---|---|---|---|
| 2006/0015492 A1* | 1/2006 | Keating | G06V 10/507 707/E17.02 |
| 2008/0181524 A1* | 7/2008 | Nonaka | G06T 7/97 382/254 |

OTHER PUBLICATIONS

Wu ("Close & closer: discover social relationship from photo collections", IEEE, ICME 2009, Aug. 2009, pp. 1652-1655). (Year: 2009).*

* cited by examiner

*Primary Examiner* — Wei Wen Yang
(74) *Attorney, Agent, or Firm* — HOGAN LOVELLS US LLP

(57) ABSTRACT

A method for selecting important digital images in a collection of digital images, comprising: analyzing the digital images in the collection of digital images to identify one or more sets of similar digital images; identifying one or more sets of similar digital images having the largest number of similar digital images; selecting one or more digital images from the identified largest sets of similar digital images to be important digital images; and storing an indication of the selected important digital image in a processor accessible memory.

20 Claims, 11 Drawing Sheets

METHOD OF SELECTING IMPORTANT DIGITAL IMAGES

CROSS-REFERENCE TO RELATED APPLICATIONS

This application is a continuation of U.S. application Ser. No. 16/786,610, filed on Feb. 10, 2020, which is a continuation of U.S. application Ser. No. 15/824,657, filed on Nov. 28, 2017 (issued as U.S. Pat. No. 10,558,860), which is a continuation of U.S. application Ser. No. 14/285,163, filed on May 22, 2014 (issued as U.S. Pat. No. 9,858,504), which is a continuation of U.S. application Ser. No. 12/889,557, filed on Sep. 24, 2010 (issued as U.S. Pat. No. 8,774,528). The aforementioned applications are hereby incorporated by reference in their entirety.

FIELD OF THE INVENTION

This invention pertains to the field of digital photography and more particularly to automatically selecting important digital images based on similarity, quality, and appeal.

BACKGROUND OF THE INVENTION

In recent years, there has been a proliferation of low cost and high quality digital capture devices such as digital cameras, personal digital assistants (PDAs) and camera phones. Most of these devices are capable of recording both still and motion digital images and many of these devices incorporate wireless network access, touch screen interfaces, low cost internal, removable, and network accessible image storage, and various sensors to monitor the motion, orientation, and location of the device. These factors have enhanced the opportunities for "picture taking" and reduced the effort and expense of photography to the point where users are now amassing vast collections of digital images. As a result of this reduction of the cost, effort, and convenience thresholds to capturing digital images, accessing important images within these collections has become increasing difficult due to the sheer volume of content.

Various schemes have been developed for organizing collections of digital images and identifying important images within such collections, many of which rely on user actions to designate important images through means such as: tagging individual images as "favorites", "star rating systems", or providing "meaningful comments" which are linked to the images. These systems cannot identify important images unless the user makes the effort to provide this information.

Another approach for identifying important images relies on automated image analysis algorithms to rank images based on aesthetic or technical image quality. Aesthetic image quality relates to the attractiveness of an image to a human observer. Technical image quality ranking algorithms rate images according to quantitative metrics such as colorfulness, exposure, sharpness and noise. Such automatic image quality evaluation methods may not necessarily reflect the importance of a particular image to a user. For example, the user may cherish an important image of a newborn, a pet, or a lost loved one, that may be poorly composed, monochromatic, underexposed, and slightly out of focus, which would be ranked low by aesthetic and technical quality ranking algorithms.

U.S. Pat. No. 6,535,636 to Savakis, entitled "Method for automatically detecting digital images that are undesirable for placing in albums" teaches automatically determining an overall image quality parameter by assessing various technical image quality attributes (e.g., sharpness, contrast, noise, and exposure).

U.S. Pat. No. 6,658,139 to Cookingham et al., entitled "Method for assessing overall quality of digital images" teaches a method determining a numerical representation of user perceived overall image quality of a digital image. The method involves creating a digital reference image series with each digital reference image having a corresponding numerical representation of overall image quality. User inputs are collected while iteratively displaying a digital test image in comparison with the digital reference images. The user inputs are analyzed to infer a numerical representation of the overall image quality of the digital test image.

U.S. Pat. No. 6,940,545 to Ray, entitled "Face detecting camera and method" teaches automatically assessing aesthetic image quality based on whether detected faces are positioned in a location consistent with the "rule of thirds."

Pre- and post-capture user interaction monitoring has also been used to determine important images. Such approaches are based on the monitoring of user behavior, changes to user expressions, or changes to user physiology while capturing, viewing, or utilizing images. These techniques often involve additional devices such cameras to monitor, record, and analyze facial expressions or eye gaze or dilation, or devices that monitor galvanic skin response (GSR), heart rate, breathing rate or the like. In other cases, user interaction with images is monitored and recorded within the capture device to monitor user interactions with the image capture device. For example, interaction with the zoom control, exposure button, exposure modes and settings can be monitored to determine the level of effort the user engaged in to capture the image. Similarly post capture interaction, such as image review with a capture device's integrated display screen or after the images have been transferred to a computer or printer, these interactions can be analyzed to determine via utilization models which images are important to users.

U.S. Pat. No. 7,620,270 to Matraszek et al., entitled "Method for creating and using affective information in a digital imaging system" discloses a retrieval procedure for stored digital images based a user's affective information. The affective information is obtained by a signal detecting means representing an emotional reaction of the user to one of the stored digital images. Digital images are categorized based on the affective information.

U.S. Pat. No. 7,742,083 to Fredlund et al., entitled "In-camera dud image management," teaches automatically determining a value index from one or more of: user inputs to said camera during capture, usage of a particular image record following capture, semantic image content of an image record, and user reactions to the image record. Image records are classified into unacceptable image records having value indexes within a predetermined threshold and acceptable image records having respective said value indexes beyond the predetermined threshold.

What is required is a system to identify important images that does not require additional devices or sensors to monitor user behavior, is not limited to generic aesthetic or quality standards, and does not place any additional burdens on users.

SUMMARY OF THE INVENTION

The present invention represents a method for selecting important digital images in a collection of digital images, comprising:

using a processor to automatically analyze the digital images in the collection of digital images to identify one or more sets of similar digital images;

identifying one or more sets of similar digital images having the largest number of similar digital images;

using a processor to automatically select one or more digital images from the identified largest sets of similar digital images to be important digital images; and storing an indication of the selected important digital image in a processor accessible memory.

This invention has the advantage that important digital images can be selected without any user intervention. The selected important digital images can be used for a wide variety of applications such as creating photographic products or sharing with other users.

It has the additional advantage that the selection of the important digital images is based on the identification of sets of similar digital images which takes advantage of the fact that photographers often capture multiple versions of important digital images.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image", as used herein, refers to any digital image, such as a digital still image or a digital video. Digital videos are generally composed of a plurality of video frames, each of which can also be treated as an individual digital image.

Figure 1:
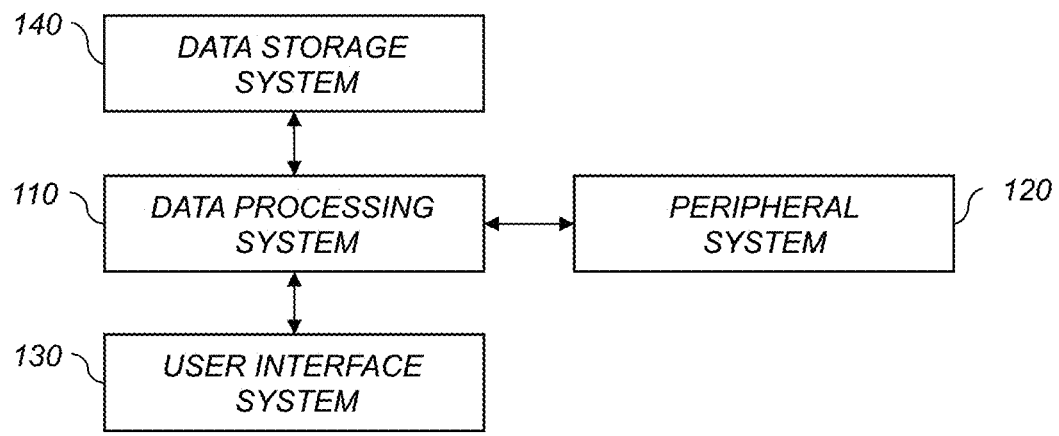
FIG. 1 is a high-level diagram showing the components of a system for identifying one or more important digital images in a collection of digital images according to an embodiment of the present invention.

FIG. 1 is a high-level diagram showing the components of a system for identifying important digital image in a collection of digital images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
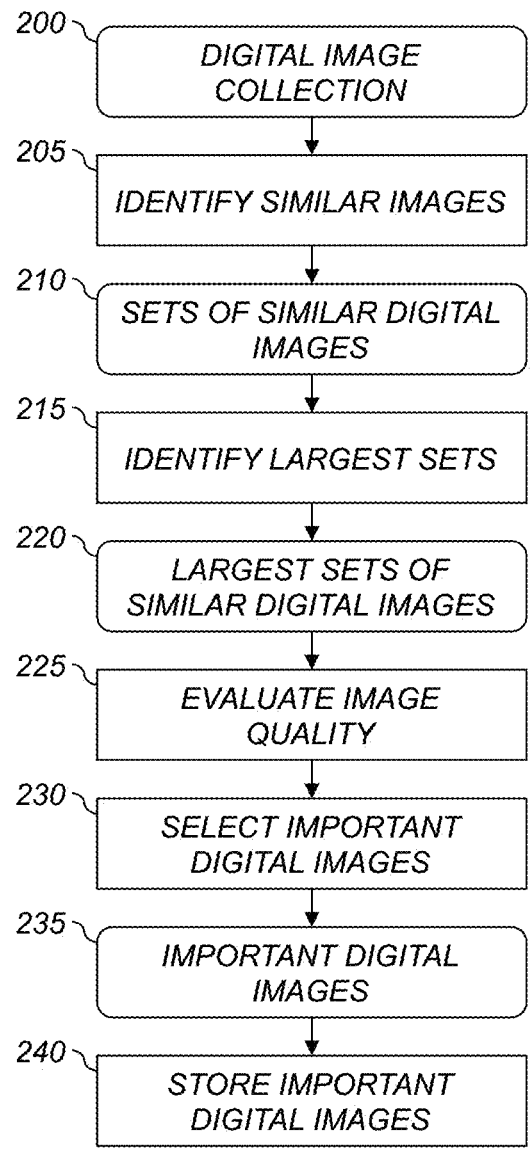
FIG. 2 is a flow diagram of a method for identifying one or more important digital images in a collection of digital images according to an embodiment of the present invention.

The present invention will now be described with reference to FIG. 2. In the illustrated embodiment, an identify similar images step 205 is executed by the data processing system 110 (FIG. 1) to identify sets of similar digital images 210 from a digital image collection 200 stored on the data storage system 140 (FIG. 1). The present invention takes advantage of the fact that when a photographer captures important digital images, they often capture more than one image. For example, the photographer may take multiple photographs of a family portrait in order to capture one where all of the subjects are smiling and have their eyes open. Similarly, if the photographer is capturing images of a beautiful sunset scene, he/she will often capture multiple versions to make sure they get a good image.

The identify similar images step 205 can use any method known in the art to assess image similarity. In the context of the present invention, image similarity can be based on various features such as visual similarity (i.e., similarity in visual appearance), image classification similarity, event clustering, capture location similarity, capture time similarity, capture sequence order, or recurring time intervals.

In a preferred embodiment of the present invention, image similarity is based, at least in part, on visual similarity between the digital images. Any method for determining visual similarity can be used in accordance with the present invention. For example, commonly-assigned U.S. Pat. No. 6,826,316 to Luo et al., entitled "System and method for determining image similarity," which is incorporated herein by reference, describes a visual similarity algorithm that can be used in accordance with the present invention.

Image classification similarity can be determined by classifying images based on features such as scene type (e.g., beach, sunset), event type (e.g., birthday, wedding, vacation), location type (e.g., museum, playground), object type (e.g., animal, boat, flower) or person identification. Any method for image classification known in the art can be used in accordance with the present invention. Exemplary details of image classifiers are described in U.S. Pat. No. 6,282,317 entitled "Method for automatic determination of main subjects in photographic images;" U.S. Pat. No. 6,697,502 entitled "Image processing method for detecting human figures in a digital image assets;" U.S. Pat. No. 6,504,951 entitled "Method for Detecting Sky in Images;" U.S. Patent Application Publication 2004/003746 entitled "Method for Detecting Objects in Digital image assets;" U.S. Patent Application Publication 2005/0105775 entitled "Method of Using Temporal Context for Image Classification;" and U.S. Patent Application Publication 2005/0105776 entitled "Method for Semantic Scene Classification Using Camera Metadata and Content-based Cues." and An "event" cluster corresponds to a group of digital images associated with a particular event such as a birthday, holiday gathering or vacation. Any method for event classification known in the art can be used in accordance with the present invention. For example, event clustering algorithms are described in detail in commonly assigned U.S. Pat. No. 6,606,411 entitled "A method for Automatically Classifying Images Into Events," and commonly assigned U.S. Pat. No. 6,351,556, entitled "A Method for Automatically Comparing Content of Images for Classification Into Events."

Capture time similarity and capture location similarity can be determined using any method known in the art. For example, sets of digital images that are captured at capture locations within a predefined distance of each other (e.g., as determined by a global positioning system sensor) can be designated to be similar digital images. Likewise, sets of digital images that are captured within a predefined capture time range (e.g., ten minutes) can be designated to be similar digital images.

In some cases, reliable capture times may not be available (e.g., if the images have been edited using software that did not preserve the capture time metadata). In this case, capture sequence order can often be inferred from file names which include an image number designation (e.g. "100_0364.jpg"). The capture sequence order can provide important clues to identifying sets of similar images.

In some embodiments, images falling within a specified time interval (e.g., the time interval corresponding to a family picnic) can be designated to be similar digital images. Similarly, images that are captured at specified recurring time intervals (e.g., annual events such as holidays, birthdays and summer vacations) can also be candidates for collecting into sets of similar digital images. For example, many image collections contain photos of a birthday cake on a child's birthday each year; such digital images can be designated to be a set of similar digital images.

In some embodiments, multiple image similarity criteria can be combined to determine the sets of similar digital images 210. For example, an event clustering algorithm can be used to form clusters of digital images corresponding to different events. The digital images within each event cluster can then be analyzed according to visual similarity to determine the sets of similar digital images 210. Alternately, a plurality of image similarity criterion (e.g., visual similarity, capture location similarity, and capture time similarity) can be combined to form a single image similarity metric by computing a weighted combination of the different image similarity criterion.

After the sets of similar digital images 210 have been identified, an identify largest sets step 215 is executed by the data processing system 110 (FIG. 1) to identify largest sets of similar digital images 220. In some embodiments, the identify largest sets step 215 can identify sets of similar digital images 210 including more than a predefined threshold number of digital images (e.g., 3). Alternately, the identify largest sets step 215 can adaptively adjust the threshold number of digital images in order to obtain a number of largest sets of similar digital images 220 that falls within some target range The data processing system 110 (FIG. 1) then executes an evaluate image quality step 225 to assess the image quality of the digital images in each of the largest sets of similar digital images 220. In the context of the present invention, image quality may be based on metrics related to features such as aesthetic image quality, facial presentation, quantitative image attributes (e.g., sharpness, image noise, image colorfulness, image contrast), social relationships between persons included in a digital image and a reference individual, utilization patterns for the digital image (e.g., number of times an image has been printed, viewed, shared, uploaded to social networking web sites, etc.), user-designated ratings (e.g., a favorites tag or a high star rating such as five out of five stars) or other image quality metrics known to those skilled in the art.

The aesthetic quality of a digital image can be estimated using any method known in the art. In some embodiments, aesthetic quality can be estimated by considering factors such whether the presentation (e.g., size and location) of any faces detected in the digital image follow accepted composition rules (e.g., the "rule of thirds"). One method for automatically estimating the aesthetic quality of digital images that can be used in accordance with the present invention is taught in commonly-assigned, co-pending U.S. patent application Ser. No. 12/566,706, to Cerosaletti, et al., entitled "Estimating aesthetic quality of digital images," which is incorporated herein by reference. This method estimates an aesthetic quality parameter by evaluating image features related to people, vanishing points, and color and structure. A method for estimating aesthetic image quality based on facial presentation is described in the aforementioned U.S. Pat. No. 6,940,545 to Ray.

Any method known in the art for determining quantitative image quality attributes can be used in accordance with the present invention. For example, the aforementioned U.S. Pat. No. 6,535,636 to Savakis teaches automatically determining an overall image quality parameter by assessing various technical image quality attributes (e.g., sharpness, contrast, noise, and exposure).

Digital images containing persons that are closely related to a reference individual (e.g., children, parents, siblings or close friends) are generally considered to be of higher importance to the reference individual. Therefore, for cases where the identity of persons in digital images are known (e.g., by using automatic face recognition or by manual identification), the social relationship between the individuals can be used as an indication of "image quality" or "image importance." Higher weight can be given depending on the closeness of the social relationship.

Digital images that a user has utilized for various purposes (e.g., viewing, printing, sharing or uploading) are likely to be of higher importance to the user than digital images that have never been utilized. Therefore, image utilization patterns (e.g., the number of times that a particular digital image has been utilized) can be used as an indication of "image quality" or "image importance." In some embodiments, certain usages (e.g., printing or sharing) can be weighted more heavily than other usages (e.g., viewing).

In some cases, user-designated ratings may be available for some or all of the digital images in the digital image collection 200. For example, a user can be provided with a mechanism to tag a set of images as "favorites" or to rate digital images using a "star rating." Such information can be used to provide important information about the importance of the digital images to the user.

In some embodiments, only a single image quality criterion can be evaluated to estimate the image quality of the digital images in the largest sets of digital images 220. In other embodiments, multiple image quality criteria can be combined to estimate the image quality. For example, a weighted combination can be used to combine an aesthetic image quality value, a quantitative image quality value and a utilization pattern quality value.

After the evaluate image quality step 225, the data processing system 110 (FIG. 1) executes a select important digital images step 230. In the context of the present invention, the select important digital images step 230 identifies one or more important digital images 235 from the largest sets of similar digital images 220 responsive to the determined image quality values. In a preferred embodiment, the select important digital images step 230 selects the digital image from each of the largest sets of similar digital images 220 having the highest image quality value to be designated as important digital images 235. In some embodiments, any digital images having an image quality value less than a threshold image quality level are excluded from the important digital images 235. The threshold image quality level can be predefined, or can be adjusted adaptively such that the important digital images 235 include a desired number of digital images.

In other embodiments, the select important digital images step 230 selects the digital images from the largest sets of similar digital images by comparing the image quality value for each image to a threshold image quality level. (As discussed above, the threshold image quality level can be predefined, or can be determined adaptively such that the important digital images 235 include a specified number of digital images.) With this approach, more than one digital image can be selected from particular largest sets of similar digital images if those sets of similar digital images contain multiple digital images having a high image quality level, while no digital images may be selected from other sets of similar digital images. Variations of this embodiment can involve applying additional criteria. For example, in addition to having an image quality value that exceeds the threshold image quality level, it can be required that the selected important digital images are significantly different in visual appearance.

Once the important digital images 235 have been identified, the data processing system 110 (FIG. 1) executes a store important digital images step 240 to store an indication of the selected important digital image 235 to the data storage system 140 (FIG. 1). In some embodiments, the store important digital images step 240 stores copies of the actual digital image files in a designated storage location. In other embodiments, the store important digital images step 240 stores information identifying the important digital images 235. For example, the store important digital images step 240 can store a list of filenames for the important digital image 235.

In some embodiments, in addition to storing and indication of the selected important digital image 235, the store important digital images step 240 also stores information about the relative importance of the important digital images 235. For example, the image quality value (or some other measure of relative importance) associated with a particular digital image can be stored as metadata within the digital image itself (e.g., as part of header in an EXIF image file), as an object in a database (e.g., in a relational database), or via any other storage mechanism known to those skilled in the art.

In some embodiments, the method further includes the step of using one or more of the selected important digital images 235 to create a photographic product such as a digital slide show, a photo album, a photo calendar or a photo collage. A digital slide show could be presented on a digital picture frame, a living room entertainment device (e.g., for display on a television), or a photo sharing website. A photo album could be a printed album or a soft copy album. A photo collage could be used for many applications. For example, the photo collage can be printed and framed, used to fabricate photographic products such as mouse pads or coffee mugs, used for a computer screen background, or used as a cover for a CD/DVD jewel case. The photo collage can also be used as a page in a photo album or a photo calendar.

In some embodiments, the method further includes the step of sharing the selected important digital images 235 on a social network or a photo-sharing website such as Facebook, Flickr or Kodak Gallery. In another embodiment, the method further includes the step of write protecting the selected important digital images 235 to prevent them from being deleted.

In another embodiment of the invention, the set of selected important digital images 235 may be further evaluated to assess the relative levels of importance. Such levels of importance could then be used, for example, to identify a single image or a collage of a few of the highest quality digital images for the cover of a photo album or DVD case; or to identify which digital images should be emphasized (e.g., displayed larger) in a photographic product produced using the selected important digital images 235; or to identify which digital images could be used as navigational icons in a graphical user interface (GUI) for browsing the digital image collection 200.

Figure 3:
FIG. 3 illustrates a sample digital image collection.

FIGS. 3-8 provide examples of applying the method of the present invention to a digital image collection 200. FIG. 3 shows a sample graphical user interface (GUI) 300 for viewing a digital image collection 200 on a soft copy display. The GUI 300 includes a scrollable grid of thumbnails for digital images 310. A scroll bar 320 allows a user to scroll through the digital image collection 200.

Figure 4:
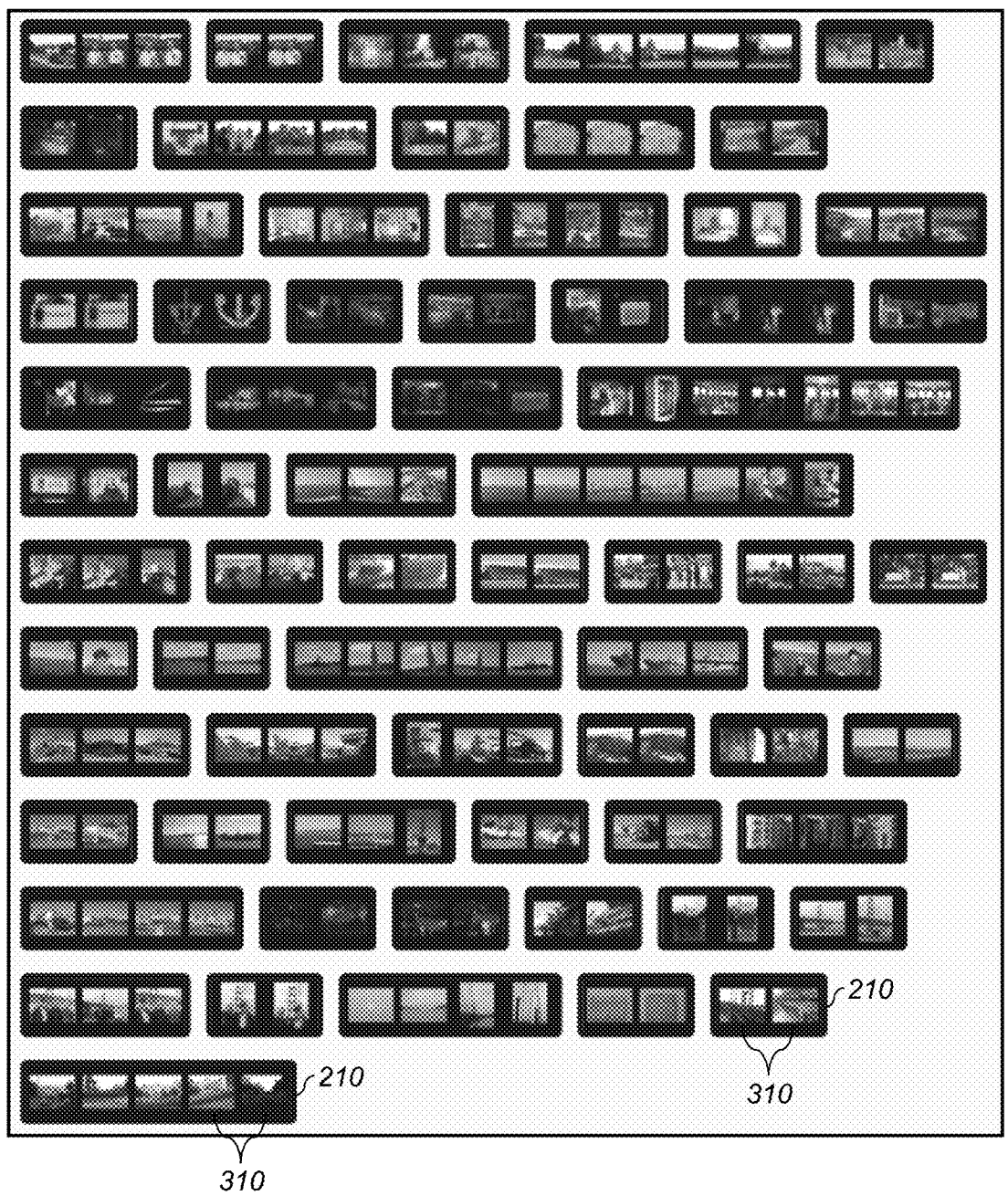
FIG. 4 illustrates sets of similar digital images identified within the sample digital image collection of FIG. 3.

FIG. 4 shows a sample GUI 400 for displaying sets of similar digital images 210 determined by applying the identify similar images step 205 (FIG. 2) to the digital image collection 200 of FIG. 3. The sets of similar digital images 210 each contain a plurality of digital images 310 that have a high level of image similarity.

Figure 5:
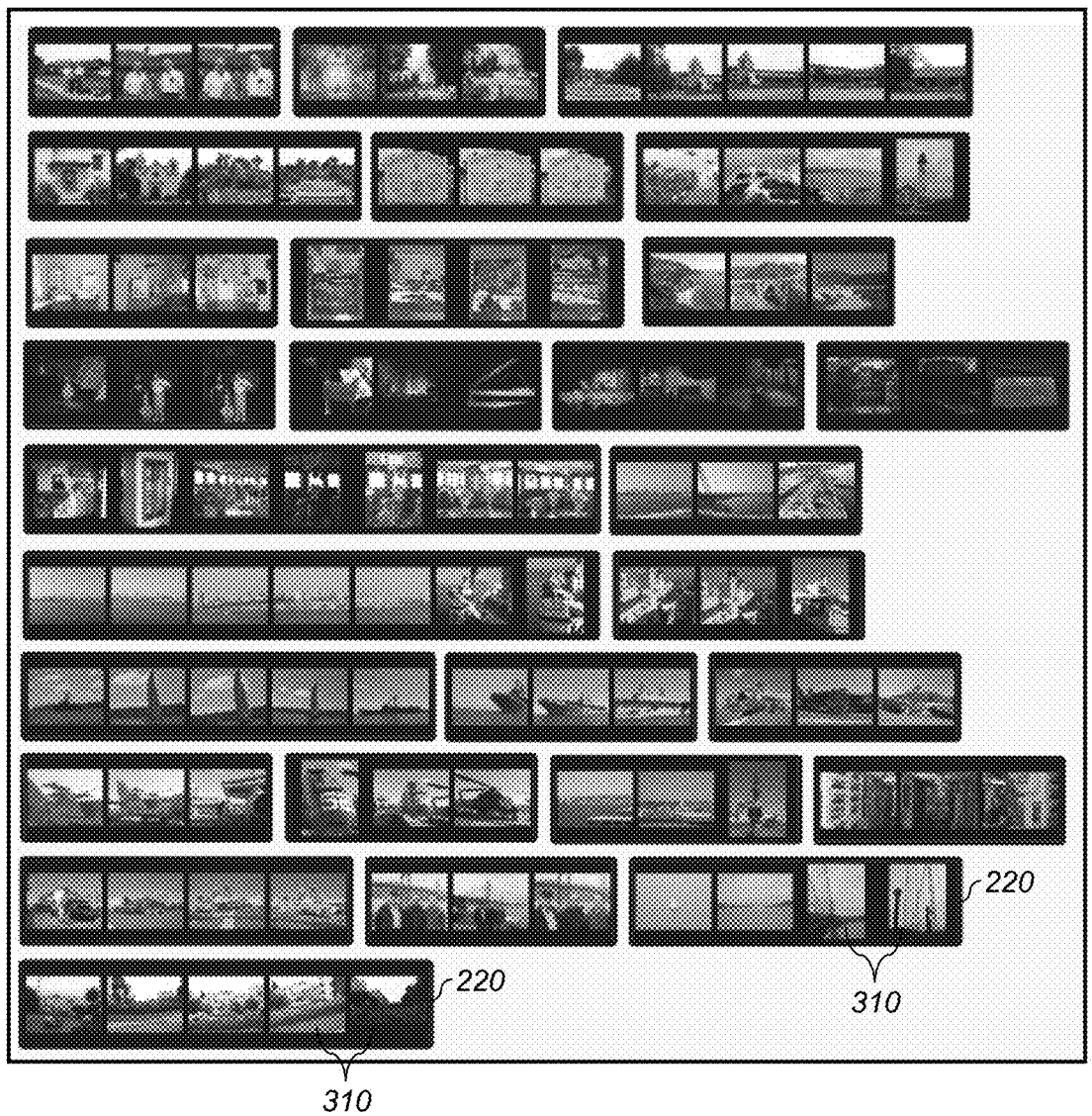
FIG. 5 illustrates the largest sets of similar digital images identified within the sample digital image collection of FIG. 3.

FIG. 5 shows a sample GUI 500 for displaying only the largest sets of similar digital images 220 from a digital image collection 200 of FIG. 3. In this case, only the sets of similar digital images 210 in FIG. 4 that include at least 3 digital images 310 are identified as largest sets of similar digital images 220.

Figure 6A:
FIG. 6A illustrates a sample graphical user interface highlighting an important digital image within each of the largest sets of similar digital images.

FIG. 6A shows a sample GUI 600 for displaying the largest sets of similar digital images 220 where the important digital images 235 determined with the select important digital images step 230 (FIG. 2) are highlighted with an outline feature. In this example, a single important digital image 235 is selected from each largest set of similar digital images 220. The GUI 600 allows users to easily see the important digital images 235 within the context of the largest sets of similar digital images 220. In some embodiments, the user can be allowed to override the automatically selected important digital images 235 by designating alternative (or additional) important digital images 235. For example, the GUI 600 can be designed such that "clicking" on a particular digital image 310 toggles it between being included or excluded from the important digital images 235.

Figure 6B:
FIG. 6B illustrates a sample graphical user interface highlighting important digital images exceeding a specified image quality threshold within the largest sets of similar digital images.

FIG. 6B shows a GUI 610 corresponding to a modified version of FIG. 6A. In this case, the constraint is removed that a single important digital image 235 is selected for each of the largest sets of digital images 220. For example, the important digital images 235 can be selected by comparing their associated image quality value to a particular image quality threshold subject to an image similarity criterion as was discussed earlier. It can be seen that the GUI 610 includes some examples of sets of similar digital images 630 that contain more than one important digital images 235, as well as other sets of similar digital images 640 that contain no important images. By viewing the automatically selected important digital image 235 within the context of their associated largest sets of similar digital images 220, users can be given the opportunity to visually confirm whether or not they agree with the selected important digital image 235. As with the example shown in FIG. 6A, the GUI 610 of FIG. 6B can include interactive elements that allow users to easily deselect any automatically selected important digital image 235 or select an alternative digital image 310 to be an important digital image 235.

Figure 6C:
FIG. 6C illustrates a sample graphical user interface highlighting important digital images within the largest sets of similar digital images, wherein different visual highlighters are used to indicate different levels of importance.

FIG. 6C shows a modified version of FIG. 6B where the GUI 620 includes GUI elements to visually distinguish between levels of importance for the important digital images 235. For example in FIG. 6C, a dashed rectangle is used to indicate emphasis images 665, while a double rectangle indicates the best-in-set image 675. In this example, important digital images 235 that contain people are marked as emphasis images 665 and the image containing people rated as having the highest level of importance is identified as the best-in-set image 675. (A person can be detected in an important digital image 235 using any method known in the art. For example, a person can be detected by automatic means such as face recognition, or by manual means such as manual tagging.) Although in this example, the emphasis images 665 and the best-in-set image 675 were determined based on the presence of people, other factors such as image quality or social relationship to a reference individual could also be used to designate these images.

Figure 7:
FIG. 7 illustrates a sample graphical user interface for displaying the important digital images within a digital image collection, and visually depicting levels of importance.

FIG. 7 shows another example of a GUI 700, this one displaying only the important digital images 235. Similar to FIG. 6C, emphasis images 665 are indicated with a dashed border and a best-in-set image 675 is indicated with a double line border. Showing only the important digital images 235 facilitates the ability to sort the list of important digital images 235 by user-specified criteria. For example, the sequence in which the important digital images are displayed may be based on rank order of importance, time, themes, or any other vector of metadata of interest to the user.

Figure 8:
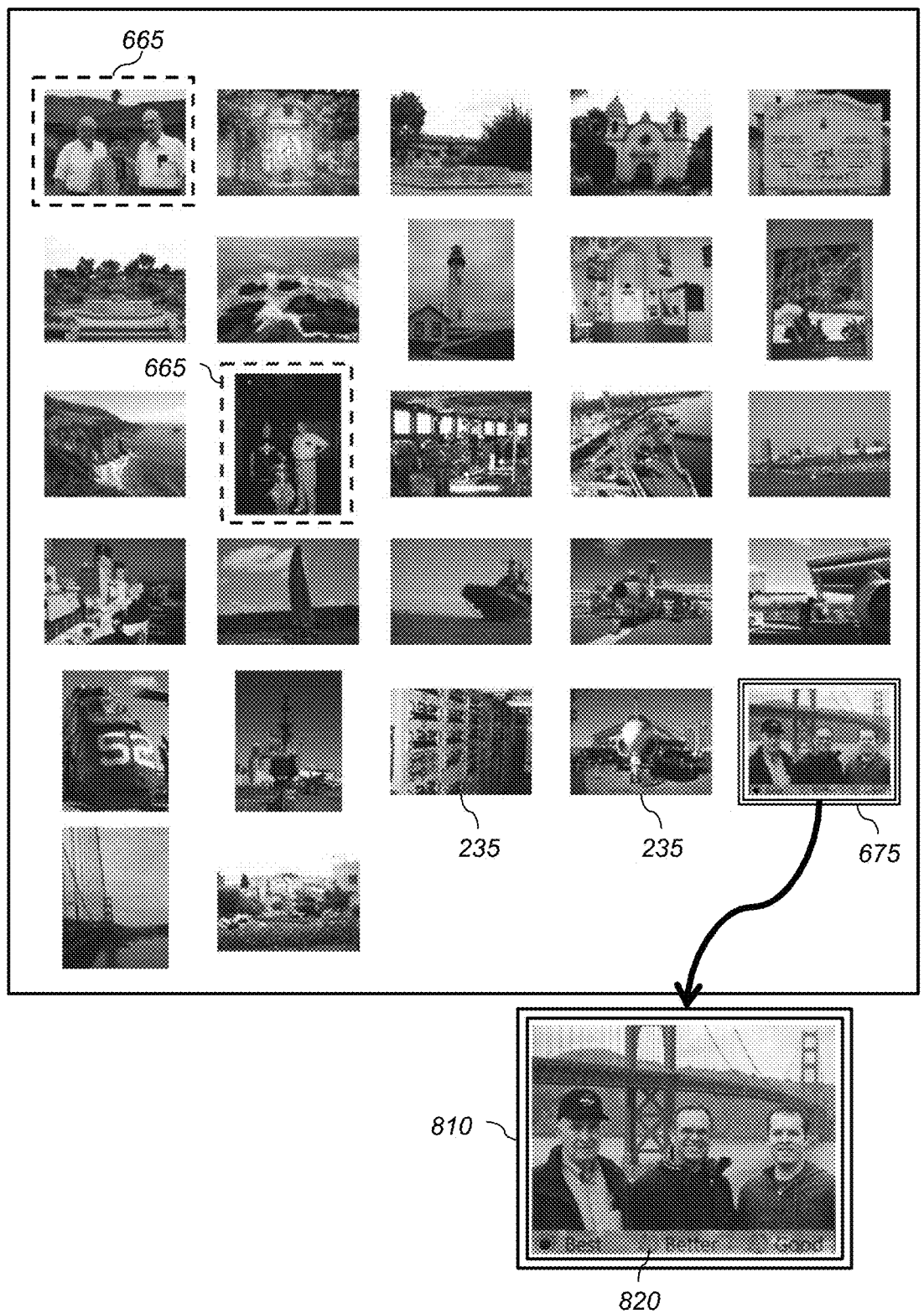
FIG. 8 illustrates a sample graphical user interface for manually changing the level of importance of an important digital image.

Similar to FIG. 7, FIG. 8 shows a GUI 800 displaying only the important digital images 235. In this case, the GUI 800 also includes GUI elements for manually changing the level of importance of an important digital image 235. The zoomed-in view 810 of the best-in-set image 675 shows a set of radio buttons 820 that can be used to change the level of importance of a given important digital image 235. A user can simply click on the radio button of the desired level of importance to set the level of importance to that value. The radio buttons 820 can be included on each of the important digital images 235, or alternately can be shown only when selects a particular image (for example, by moving a cursor over on a particular image or by clicking on a particular image).

In some embodiments of the current invention, the automatic selection method used by the select important digital images step 230 can be updated to preferentially select digital images based on historical user input. This includes user input received for important digital images 235 to exclude or include, as well as user changes to level of importance for important digital images 235. For example, the automatic selection method can be updated to preferentially select digital images similar to any user-selected important digital images. Similarly, the automatic selection method can be updated to preferentially exclude digital images similar to those which the user excluded. In some embodiments the automatic selection method may be based on weighted composition rules, and the weights of the method may be adjusted, based on the historical user input. If the user chooses more face-based pictures, or pictures of particular people or group pictures versus close-up pictures, the weights of those particular composition rules can be adjusted accordingly.

Although levels of importance are visually indicated by different border styles in FIGS. 7 and 8, indication of levels of importance can be denoted in other ways, including, but not limited to, image size, star rating, heart icon or other denotations known by those skilled in the art.

Figure 9:
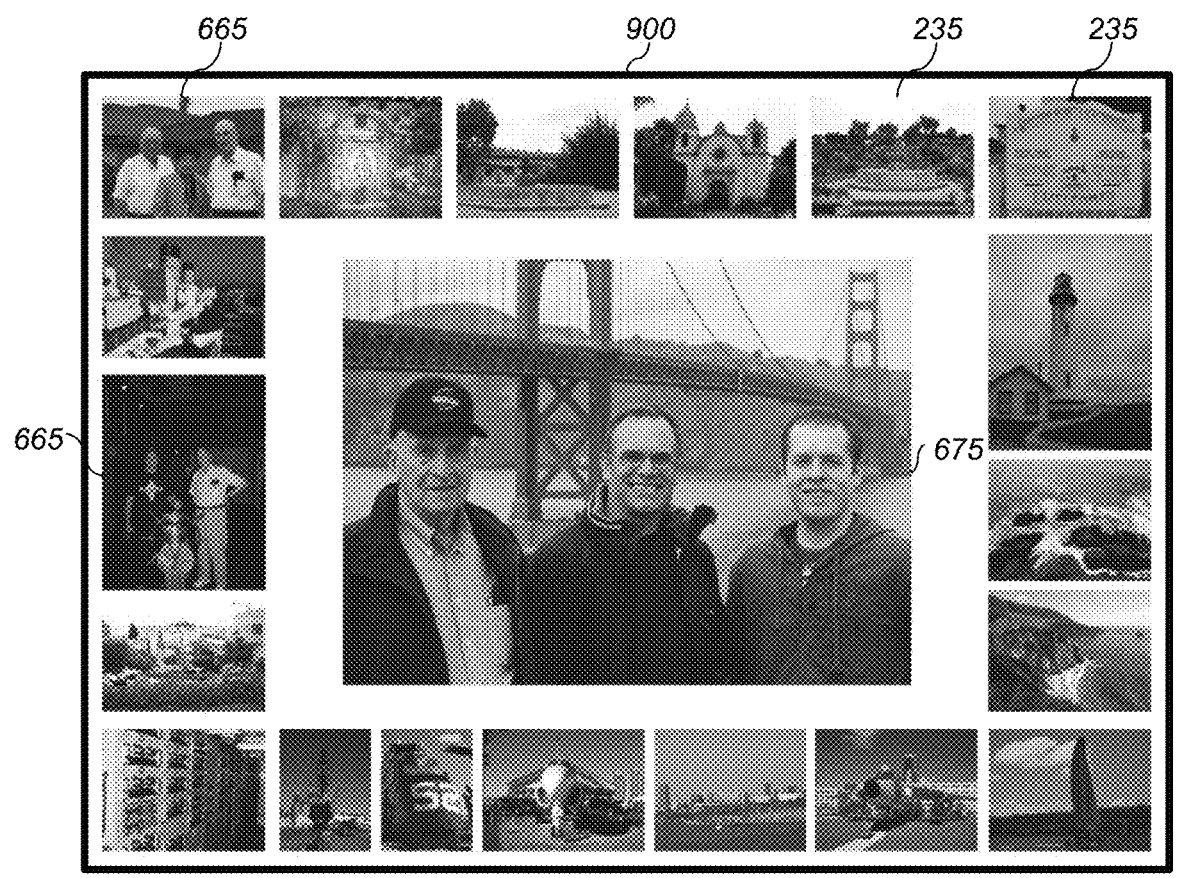
FIG. 9 illustrates a sample collage created using important digital images from a digital image collection.

FIG. 9 shows an example collage 900 that was created from the best-in-set image 675, the emphasis images 665 and some of the other important digital images 235 shown in FIG. 8. The best-in-set image 675 is featured prominently in the center of the collage 900 with a larger image size. In this case, the important digital images 235 having the highest quality level (i.e., highest importance level) were selected for inclusion in the collage. In some embodiments other criteria may also be used, such as whether a particular collage layout requires landscape or portrait orientation images in particular locations. The collage 900 can be printed and framed for display in a home, or can be used for other purposes such as for a page of a photo calendar. It will be obvious to one skilled in the art that the important digital images 235 identified according to the method of the present invention can be used to create a wide variety of photographic products including, but not limited to digital slide shows, photo albums, photo calendars, mouse pads, coffee mugs or CD/DVD jewel cases.

While the examples herein have focused on digital image collections 200 comprised of digital still images, the method of the present invention can also be applied to digital videos. In this case, the digital image collection 200 can be a digital video (or a collection of digital videos), and the video frames of the digital video can each be treated as individual digital images. When the method of the present invention is applied to digital videos, the identify similar images step 205 will tend to identify sets of video frames that make up individual scenes within the digital video. Therefore, it can be seen that the method of the present invention can be used to identify the video frames having the highest image quality within the longest scenes in the digital video. The resulting selected important images can be considered to be "key frames" and can be used for a variety of purposes. For example, they can be used to form an index for a digital video summarizing the important scenes in the digital video. The index can then be printed (e.g., to be used as a cover for a DVD jewel case) or can be used to form a menu of selectable scenes that can be accessed using a DVD player remote control.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 digital image collection
205 identify similar images step
210 sets of similar digital images
215 identify largest sets step
220 largest sets of similar digital images
225 evaluate image quality step
230 select important digital images step
235 important digital images
240 store important digital images step
300 graphical user interface
310 digital image
320 scroll bar
400 graphical user interface
500 graphical user interface
600 graphical user interface
610 graphical user interface
620 graphical user interface
630 set of similar digital images
640 set of similar digital images
665 emphasis image
675 best-in-set image
700 graphical user interface
800 graphical user interface
810 zoomed-in view 820 radio buttons
900 collage

The invention claimed is:

1. A method of determining image importance comprising:
- analyzing, via a processor of an electronic device, a plurality of digital images stored on a computer memory;
- identifying, via the processor, a plurality of similar images from the plurality of digital images
- receiving, via the processor, user-designated ratings for each of the plurality of similar images;
- determining, via the processor, a qualitative image quality value for each of the plurality of similar images;
- determining, via the processor, an aesthetic image quality value for each of the plurality of similar images;
- evaluating, via the processor, a utilization pattern for each of the plurality of similar images;
- determining, via the processor, one or more important images from the plurality of similar images from a weighted combination of the user-designated ratings, the qualitative image quality values, the aesthetic image quality values, and the utilization patterns of the plurality of similar images; and
- storing the one or more important images or identification information of the one or more important images along with information about a relative importance of the one or more important images in a metadata of the one or more important images or as an object in a database.

2. The method of claim 1 wherein the utilization patterns are weighted based on the type of usage of the plurality of similar image.

3. The method of claim 1 wherein the user-designated ratings comprise a "favorites" or "star rating" mechanism.

4. The method of claim 1 further comprising:
- filtering, via the processor, one or more similar images with image quality values less than a threshold image quality level.

5. The method of claim 4 wherein the threshold image quality level is predefined.

6. The method of claim 4 wherein the threshold image quality level is adjusted adaptively to include a desired number of digital images in the one or more important images.

7. The method of claim 1 wherein the plurality of similar images is based on similarity in visual appearance, image classification similarity, event clustering, capture location similarity, capture time similarity, capture sequence order, or recurring time intervals.

8. The method of claim 1, wherein identifying the plurality of similar images further comprises:
- identifying, by the processor, images containing persons that are closely related to a reference individual by using automatic face recognition or by manual identification.

9. The method of claim 8 wherein the weighted combination further comprises:
- a social relationship between the reference individual and persons included in the digital images.

10. The method of claim 1 wherein the qualitative image quality value relates to image attributes comprising sharpness, image noise, image colorfulness, or image contrast.

11. The method of claim 1 further comprising:
- displaying, via the processor, each of the one or more important images on a Graphic User Interface (GUI).

12. The method of claim 11 wherein the one or more important images are displayed according to a relative level of importance.

13. The method of claim 12 wherein the GUI is reordered based on updated levels of importance of the one or more important images.

14. The method of claim 1 wherein the plurality of similar images is a largest subset of the plurality of digital images.

15. The method of claim 14 wherein the largest subset of the plurality of digital images is greater than a pre-defined threshold.

16. The method of claim 1 further comprising:
- designating, by the processor, an image with a highest importance value.

17. The method of claim 16 further comprising:
- displaying, by the processor, a rendering of a photographic product with the image with the highest importance value on an electronic device.

18. The method of claim 1 further comprising:
- assigning, by the processor, an image importance value to each of the plurality of similar images.

19. The method of claim 18 wherein the assigned image importance values are stored in a processor accessible memory.

20. The method of claim 1 wherein the aesthetic image quality values are based on facial presentations within the plurality of similar images.

* * * * *